United States Patent
Ishikawa

[19]

[11] Patent Number: 5,834,729
[45] Date of Patent: Nov. 10, 1998

[54] METHOD FOR CONTROLLING RESISTANCE WELDING USING ADJUSTABLE FUZZY REASONING

[75] Inventor: Sakae Ishikawa, Chiba-ken, Japan

[73] Assignee: Miyachi Technos Corporation, Chiba-ken, Japan

[21] Appl. No.: 745,265

[22] Filed: Nov. 8, 1996

[30] Foreign Application Priority Data

Nov. 17, 1995 [JP] Japan .................................. 7-323848

[51] Int. Cl.⁶ .................................................. B23K 11/24
[52] U.S. Cl. ....................................... 219/110; 219/117.1
[58] Field of Search .................................. 219/108, 110, 219/109, 117.1; 395/61, 900

[56] References Cited

U.S. PATENT DOCUMENTS

| | | | |
|---|---|---|---|
| 5,270,516 | 12/1993 | Hamamoto et al. | 219/130.33 |
| 5,367,610 | 11/1994 | Ohtsubo et al. | 395/61 |
| 5,517,420 | 5/1996 | Kinsman et al. | 364/474.08 |
| 5,519,810 | 5/1996 | Iwashita et al. | 395/61 |
| 5,591,355 | 1/1997 | Ishikawa | 219/110 |
| 5,614,116 | 3/1997 | Austin et al. | 219/130.21 |

FOREIGN PATENT DOCUMENTS

7-232280  9/1995  Japan .................................. 219/110

Primary Examiner—Gregory L. Mills
Attorney, Agent, or Firm—Wenderoth, Lind & Ponack, L.L.P.

[57] ABSTRACT

A method for adapting fuzzy reasoning to a change of a working environment of resistance welding without requiring a changing or updating of membership functions, thereby assuring optimal control and satisfactory weld quality. In an embodiment of the present invention, a welding current I and a change of resistance $\Delta R$ across welding electrodes are measured during a welding operation. The number of welding operations N involving the welding electrodes is incremented. After the present welding operation, these values of $\Delta R$, I and N are offset by adding offsetting values $\delta \Delta R$, $\delta I$ and $\delta N$. Degrees of membership of respective antecedent membership functions are computed for the offset values $(\Delta R + \delta \Delta R)$, $(I + \delta I)$ and $(N + \delta N)$. Degree of membership of conclusion membership function of each control rule is computed from degrees of membership of its antecedent membership functions. Then degrees of membership of conclusion membership functions U, S and D is composed. From the composed degree of membership, an operation value i.e., percent change of preselected welding current is computed by the center-of-gravity defuzzification method. Finally, the preselected value of the welding current is corrected by using the percent change. The corrected preselected welding current is then used for the next welding operation.

4 Claims, 7 Drawing Sheets

| CHANGE OF RESISTANCE ΔR | N_L | | | | | | N_M | | | | | | N_H | | | | | |
|---|---|---|---|---|---|---|---|---|---|---|---|---|---|---|---|---|---|---|
| | $I_L$ | | $I_M$ | | $I_H$ | | $I_L$ | | $I_M$ | | $I_H$ | | $I_L$ | | $I_M$ | | $I_H$ | |
| $\Delta R_L$ | (w1) | U | (w4) | U | (w7) | U | (w10) | U | (w13) | U | (w16) | U | (w19) | U | (w22) | U | (w25) | S |
| $\Delta R_M$ | (w2) | S | (w5) | S | (w8) | S | (w11) | S | (w14) | S | (w17) | S | (w20) | S | (w23) | S | (w26) | D |
| $\Delta R_H$ | (w3) | D | (w6) | D | (w9) | D | (w12) | D | (w15) | D | (w18) | D | (w21) | S | (w24) | D | (w27) | D |

WELDING CURRENT I

NUMBER OF WELDING OPERATIONS N

FIG.10

START

① PERFORM WELDING OPERATION FOR PREDETERMINED CYCLES, MEASURE I AND ΔR AND LET N=N+1

② ADD OFFSETTING VALUES δΔR, δI AND δN TO ΔR, I AND N, RESPECTIVELY

③ DETERMINE DEGREE OF MEMBERSHIP OF RESPECTIVE ANTECEDENT MEMBERSHIP FUNCTIONS FOR (ΔR+δΔR) (I+δI) AND (N+δN)

④ DETEMINE DEGREE OF MEMBERSHIP OF CONCLUSION MEMBERSHIP FUNCTION OF EACH CONTROL RULE FROM DEGREE OF MEMBERSHIP OF (ΔR+δΔR),(I+δI) AND (N+δN)

⑤ COMPOSE DEGREE OF MEMBERSHIP OF CONCLUSION MEMBERSHIP FUNCTIONS D, S AND U

⑥ COMPUTE CENTER OF GRAVITY FROM COMPOSED DEGREE OF MEMBERSHIP OF D, S AND U TO DETERMINE PERCENT CHANGE OF PRESELECTED VALUE OF WELDING CURRENT

⑦ CORRECT PRESELECTED VALUE OF WELDING CURRENT $I_S$ FOR NEXT WELDING OPERATION

END

FIG. 11

METHOD FOR CONTROLLING RESISTANCE WELDING USING ADJUSTABLE FUZZY REASONING

BACKGROUND OF THE INVENTION

The present invention relates to a method for controlling resistance welding.

A conventional step-up control has been employed for providing a constant-current control of the resistance welding. The step-up control is, however, a coarse control which progressively increases the preselected value of welding current per the predetermined number of welding operations. The conventional set-up control essentially relies on the experience or intuition of a field operator for setting the step-up rate, so that it is difficult to maintain the desired weld quality without using a highly skilled operator who can perform the proper setting.

In view of the above, Japanese patent application laid-open (Kokai) Hei7-232280, having the same assignee as the present invention, has proposed an improved method for controlling resistance welding which performs fuzzy reasoning in response to each welding operation and automatically updates a set or desired value of the welding current for a next welding operation based on results of the fuzzy reasoning.

The method for controlling resistance welding of this publication involves detecting a change of resistance across electrodes, and measuring welding current and/or the number of welding operations to provide an input variable or monitored signal to rule antecedents of the fuzzy reasoning. In an embodiment, the input variable is data of a detected change of resistance across the welding electrodes. To perform the fuzzy reasoning, the method predetermines a plurality of antecedent membership functions for respective degrees of a change of resistance across the welding electrodes under a welding operation and also predetermines a plurality of conclusion membership functions corresponding to the antecedent membership functions for respective degrees of a change rate of preselected value of welding current. In operation, the method detects the change of resistance across the welding electrodes during a welding operation and corrects or updates the preselected value of welding current for the next welding operation based on the detected change of resistance in accordance with the antecedent membership functions and the conclusion membership functions.

In accordance with the principles of the above identified publication, the control method may be optimized to a test environment. However, an actual working environment is subject to variations due to changes of the welding machine configuration, workpiece material, the number of workpieces, etc. Such changes can cause the membership functions to be unadapted to the working environment, resulting in an error in the fuzzy reasoning such that disadvantageous splash generates from the workpiece during operation or such that the weld quality is no longer conforming to a required standard.

An essential solution to the afore-mentioned problems might be to update the membership functions to adapt themselves to a change of the working environment. However, the membership functions of fuzzy reasoning have been determined or defined empirically based on expertise and through trial and error. Therefore, once they have been specified, it is practically impossible or unfeasible to provide additional updates or corrections.

SUMMARY OF THE INVENTION

With the afore-mentioned problems in mind, an object of the present invention is to provide a method for controlling resistance welding which is capable of providing or maintaining optimized control by adapting fuzzy reasoning to a change of the working environment without necessitating the updating or correcting of membership function involved.

To achieve the object, a first method of the invention for controlling resistance welding comprises the steps of:

setting a plurality of antecedent membership functions for respective degrees of a change of resistance across welding electrodes under welding operation;

setting a plurality of conclusion membership functions corresponding to the antecedent membership functions for respective degrees of a change rate of a preselected value of welding current;

detecting the change of resistance across the welding electrodes during each welding operation;

offsetting the detected change of resistance by a predetermined value; and correcting the preselected value of welding current for the next welding operation based on the detected and offset change of resistance in accordance with the antecedent membership functions and the conclusion membership functions.

A second method of the invention for controlling resistance welding comprises the steps of:

setting a plurality of first antecedent membership functions for respective degrees of a change of resistance across welding electrodes under welding operation;

setting a plurality of second antecedent membership functions for respective degrees of a welding current under welding operation;

setting a plurality of conclusion membership functions corresponding to the first and second antecedent membership functions for respective degrees of a change rate of a preselected value of welding current;

detecting the change of resistance across the welding electrodes during each welding operation;

measuring the welding current during the welding operation;

offsetting the detected change of resistance by a predetermined value;

offsetting the measured welding current by a predetermined value; and correcting the preselected value of welding current for the next welding operation based on the detected and offset change of resistance and the measured and offset welding current in accordance with the first and second antecedent membership functions and the conclusion membership functions.

A third method of the invention for controlling resistance welding comprises the steps of:

setting a plurality of first antecedent membership functions for respective degrees of a change of resistance across welding electrodes under welding operation;

setting a plurality of second antecedent membership functions for respective degrees of the number of welding operations involving the welding electrodes;

setting a plurality of conclusion membership functions corresponding to the first and second antecedent membership functions for respective degrees of a change rate of a preselected value of welding current;

detecting the change of resistance across the welding electrodes during each welding operation;

counting the number of welding operations involving the welding electrodes;

offsetting the detected change of resistance by a predetermined value;

offsetting the counted number of welding operations by a predetermined value; and correcting the preselected value of welding current for the next welding operation based on the detected and offset change of resistance and the counted and offset count of welding operations in accordance with the first and second antecedent membership functions and the conclusion membership functions.

A fourth method of the invention for controlling resistance welding comprises the steps of:

setting a plurality of first antecedent membership functions for respective degrees of a change of resistance across welding electrodes under welding operation;

setting a plurality of second antecedent membership functions for respective degrees of a welding current under welding operation;

setting a plurality of third antecedent membership functions for respective degrees of the number of welding operations involving the welding electrodes;

setting a plurality of conclusion membership functions corresponding to the first, second and third antecedent membership functions for respective degrees of a change rate of a preselected value of welding current;

detecting the change of resistance across the welding electrodes during each welding operation;

measuring the welding current during the welding operation;

counting the number of welding operations involving the welding electrodes;

offsetting the detected change of resistance by a predetermined value;

offsetting the measured welding current by a predetermined value;

offsetting the counted number of welding operations by a predetermined value; and correcting the preselected value of welding current for the next welding operation based on the detected and offset change of resistance, the measured and offset welding current and the counted and offset count of welding operations in accordance with the first, second and third antecedent membership functions and the conclusion membership functions.

The present method for controlling resistance welding of the invention performs fuzzy reasoning in response to each welding operation, and optimizes a preselected value of welding current for the next welding operation. An input variable to rule antecedents of the fuzzy reasoning comprises an offset change of resistance across the welding electrodes, as obtained by offsetting a detected change of resistance by a predetermined value in accordance with the first method. It comprises an offset change of resistance across the welding electrodes, as obtained by offsetting a detected change of resistance by a predetermined value, and an offset welding current, as obtained by offsetting a measured welding current by a predetermined value in accordance with the second method. In accordance with the third method, the input variable comprises an offset change of resistance across the welding electrode, as obtained by offsetting a detected change of resistance by a predetermined value, and an offset count of welding operations, as obtained by offsetting a counted number of welding operations by predetermined value. In accordance with the fourth method, the input valuable comprises an offset change of resistance across the welding electrodes, as obtained by offsetting a detected change of resistance by a predetermined value, an offset welding current, as obtained by offsetting a measured welding current by a predetermined value, and an offset count of welding operations, as obtained by offsetting a counted number of welding operations by a predetermined value. An output or control variable from rule conclusions of the fuzzy reasoning comprises the preselected value of welding current. The method of the invention determines the rate of change of the preselected value of welding current by the fuzzy reasoning e.g., Max-Min method.

BRIEF DESCRIPTION OF THE DRAWINGS

The above and other objects and advantages of the invention will become more apparent from the following description taken in conjunction with the drawings in which.

PREFERRED EMBODIMENT OF THE INVENTION

Figure 1:
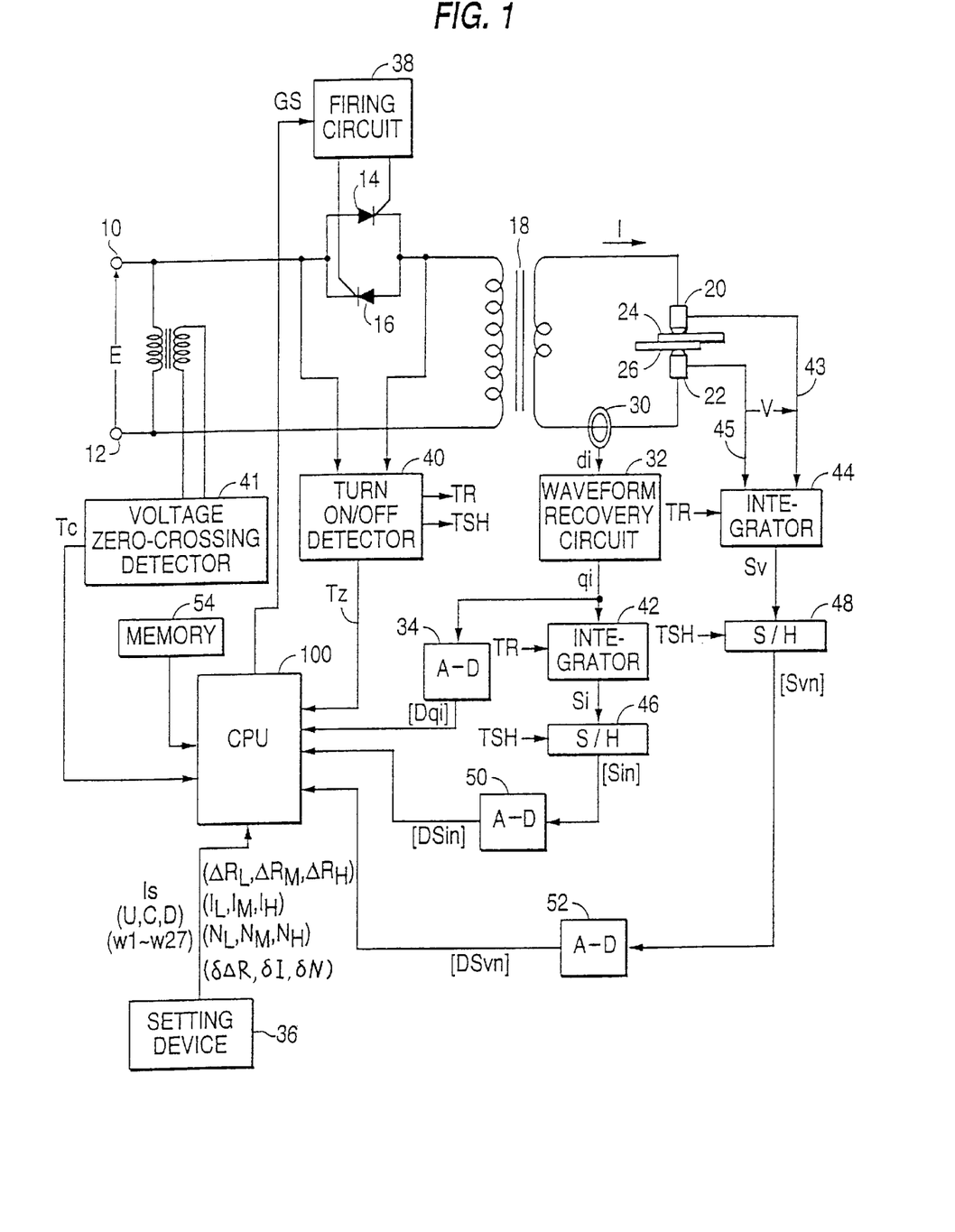
FIG. 1 is a block diagram of an arrangement of a resistance welding machine and control to which a control method of the invention applies.
Figure 2:
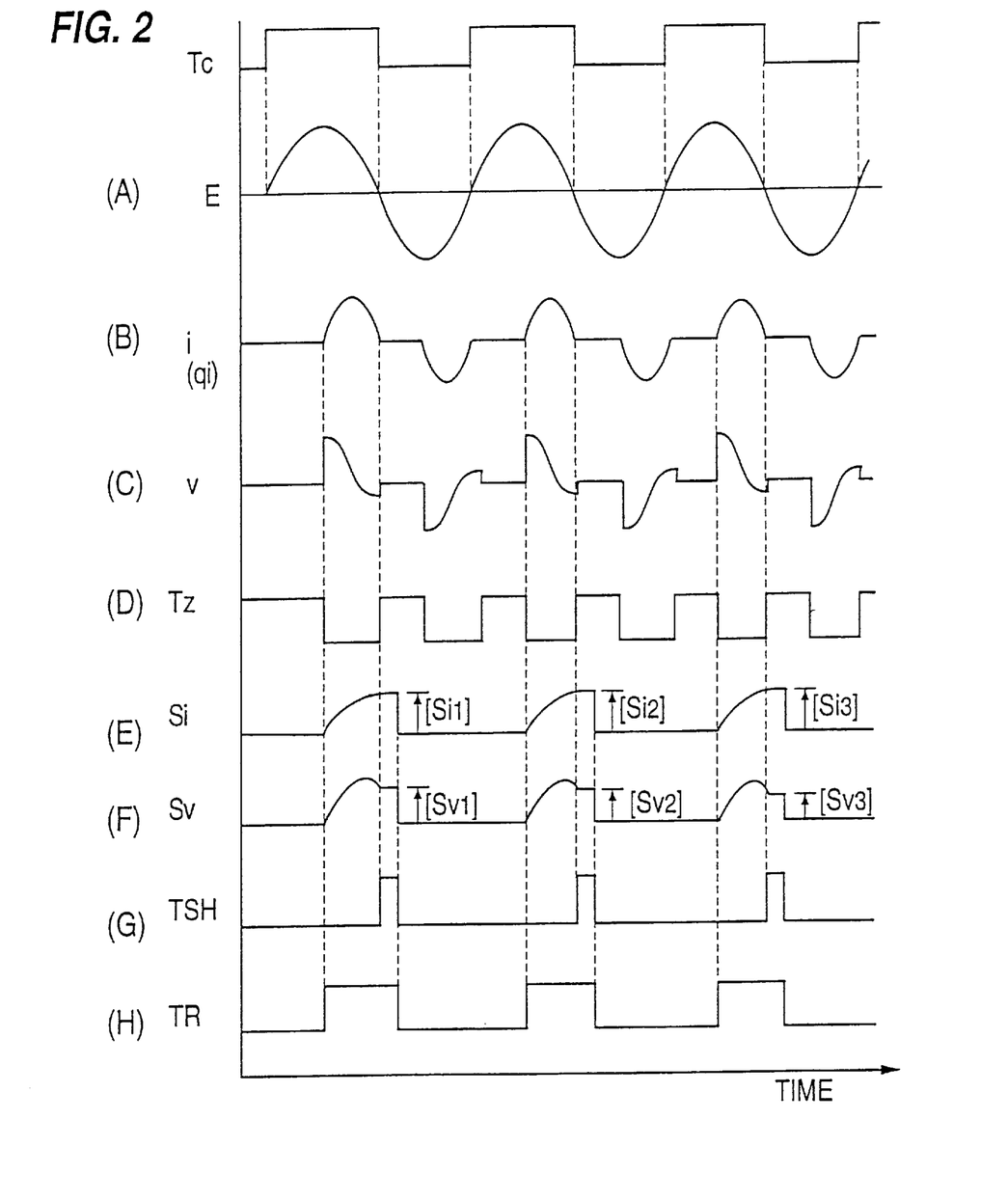
FIG. 2 is a diagram showing signal waveforms at various parts in FIG. 1.

Referring to FIG. 1, there is shown an arrangement of a single-phase alternating current resistance welding machine together with a control to which the control method of the invention applies. FIG. 2 shows signal waveforms at various parts in FIG. 1.

The input terminals 10 and 12 of the resistance welding machine receive an AC voltage E of commercial frequency (FIG. 2(A)). During a welding operation, the voltage is supplied to the primary coil of the welding transformer 18 by means of a pair of thyristors 14 and 16 constituting a contactor. The secondary voltage induced in the secondary coil of the welding transformer 18 applies across workpieces 24 and 26 by way of a secondary line and a pair of welding electrodes 20 and 22. As a result, a welding current I (FIG. 2(B)) flows through the secondary circuit.

A toroidal coil 30 is provided in the secondary circuit to detect the welding current I. The toroidal coil 30 generates a signal di having a derivative waveform of the welding current I. The toroidal coil signal di is supplied to a waveform recovery circuit 32 consisting of an integrator. The waveform recovery circuit 32 outputs a welding current signal qi (FIG. 2 (B)) having the waveform or instantaneous value of the welding current I. An analog-to-digital (A-D) converter 34 converts the welding current signal qi to a corresponding digital signal [Dqi] which is inputted to CPU 100.

CPU 100 controls the firing angle of the thyristors 14 and 16 by means of a firing circuit 38 such that the measured welding current qi matches the preselected value of welding current Is from the setting device 36.

For the firing angle control, the voltage zero-crossing detector 41 and turn-on/off detector 40 send timing signals Tc and Tz (FIG. 2(D)), respectively, to CPU 100. The voltage zero-crossing detector 41 detects zero-crossing of the supply voltage, thus generating a firing control timing signal Tc in the form of a polarity-inverting pulse. The turn-on/off detector 40 detects the start and end of the welding current of each half cycle from the voltage across the thyristor which steps down in response to the start of the welding current and steps up in response to the stop of the welding current. The turn-on/off detector 40 generates a timing signal TSH (FIG. 2(G)) for sampling/holding and a timing signal TR (FIG. 2(H)) for resetting integrator.

The combination of the toroidal coil 30, waveform recovery circuit 32, A-D converter 34, setting device 36, CPU 100, turn-on/off detector 40, firing circuit 38, voltage zero-crossing detector 41 and thyristors 14, 16 provides a feedback control circuit for maintaining a constant welding current through the workpieces 20 and 22.

During a welding operation, the present resistance welding control apparatus performs the constant-current control while at the same time measuring the effective value of the welding current I and the change of resistance $\Delta R$ across the welding electrodes 20 and 22. CPU 100 computes the effective value of the welding current I from the welding current signal [qi] supplied from toroidal coil 30 through the waveform recovery circuit 32 and A-D converter 34.

Current integrator 42, voltage integrator 44, sample-and-hold circuits 46 and 48, A-D converters 50 and 52, and CPU 100 are arranged so as to measure a change of resistance $\Delta R$ across the welding electrodes 20 and 22 for each cycle or each half cycle.

The current integrator 42 receives the welding current signal qi from the waveform recovery circuit 32. In response to the timing signal TR from turn-on/off detector 40, the current integrator 42 integrates the welding current signal qi in positive polarity with respect to time for each cycle, thus generating a current integral signal Si(FIG. 2(E)). In response to the timing signal TSH from the turn-on/off detector 40, the sample-and-hold circuit 46 samples and holds the value [Sin] (n=1, 2, . . . ) of the current integral signal Si at the time the positive welding current I becomes zero in each positive cycle (see FIG. 2(E)). A-D converter 50 converts the current S/H value [Sin] to a corresponding digital signal [DSin] and sends it to CPU 100.

The welding electrodes 20 and 22 are connected to the voltage integrator 44 through voltage detecting leads 43 and 45. Thus, during a welding operation, the voltage v (FIG. 2(C)) across the welding electrodes 20 and 22 is supplied to the voltage integrator 44. In response to the timing signal TR from the turn-on/off detector 40, the voltage integrator 44 integrates the voltage v for each time interval during which a positive welding current I flows, thus generating a voltage integral signal Sv(FIG. 2(F)).

In response to the timing signal TSH from the turn-on off detector 40, the sample and hold circuit 48 samples and holds the value [Svn] (n=1, 2, . . . ) of the voltage integral signal Sv at the time the positive welding current I becomes zero in each cycle (see FIG. 2(F)). The A-D converter 52 converts the voltage integral value [Svn] to a corresponding digital signal [DSvn] and supplies it to CPU 100. Due to induced voltage in the inductance of the resistance welding machine, the voltage v across the welding electrodes inverts its polarity in the latter half of every half cycle of the welding current. However, the induced voltage occurs in both polarities almost equally. Thus, integrating the voltage v cancels the induced voltage component so that the voltage integral value [Svn] indicates a correct integral value of the net voltage across the welding electrodes.

In accordance with the program stored in memory 54, CPU 100 computes the resistance $R_n$ across the welding electrodes for each cycle by dividing the voltage S/H value [Svn] by the current S/H value [Sin]. Then CPU 100 computes the difference of resistance $\Delta R$ (=$R_n - R_{n-1}$) between the resistance of the present cycle and that of the previous cycle. In general, when splash has occurred the resistance across the welding electrodes drops abruptly, so that a relatively large difference $\Delta R$ of resistance is detected. In this embodiment, the maximum of the difference $\Delta R$ of each cycle is to be selected as a representative value of the change of resistance of the present welding operation.

CPU 100 counts the number of the welding operations N involving the welding electrodes 20 and 22. The number N is incremented by one to N=N+1 each time a welding operation ends.

In this manner, for each welding operation, the embodiment detects the change of resistance $\Delta R$, measures effective value of the welding current I and counts the number of welding operations N. Then, the embodiment offsets these three factors $\Delta R$, I and N by a predetermined value and performs fuzzy reasoning based on the offset values to correct or update the preselected value of the welding current for the next welding operation.

Fuzzy reasoning of the embodiment will now be described. The embodiment employs one of the typical methods for fuzzy reasoning, called Max-Min method.

Figure 3:
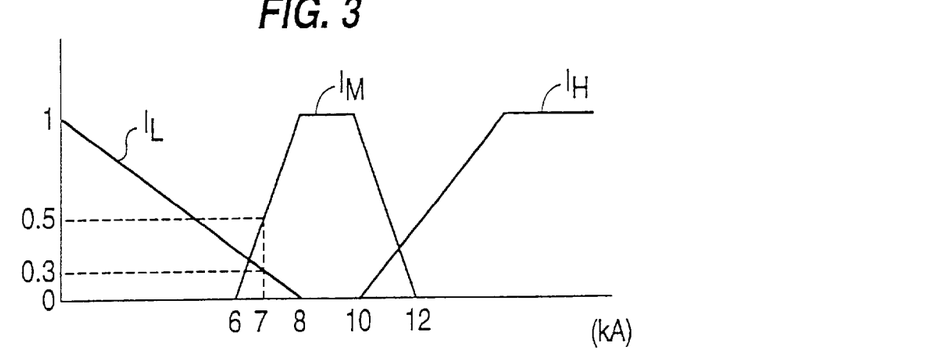
FIG. 3 is a diagram showing an example of antecedent membership functions for respective degrees of a magnitude of welding current, used in the fuzzy reasoning in accordance with the present invention.

To this end, the welding current I is classified into three groups according to its degrees, e.g., "small", "middle" and "large." A plurality of antecedent membership functions $I_L$, $I_M$ and $I_N$ are set for the respective degrees of the welding current, as shown in FIG. 3.

Figure 4:
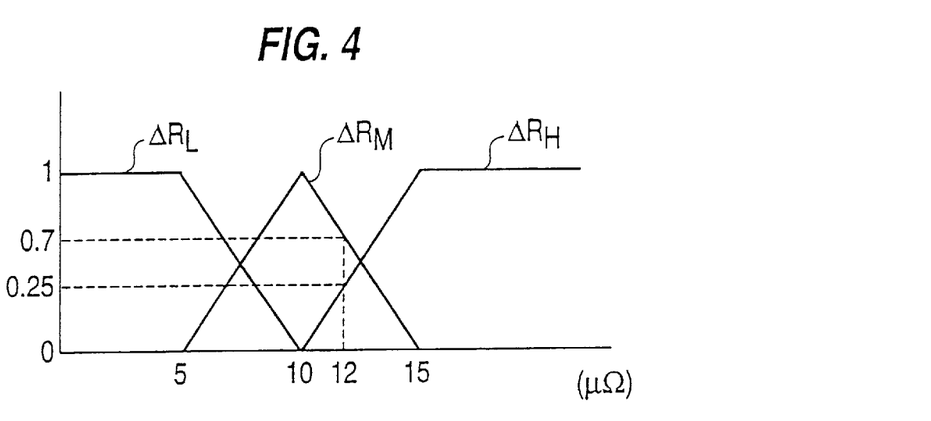
FIG. 4 is a diagram showing an example of antecedent membership functions for respective degrees of a change of resistance across welding electrodes, used in the fuzzy reasoning in accordance with the present invention.

The change of resistance $\Delta R$ across the welding electrodes 20 and 22 is also classified into three groups according to its degrees, e.g., "low", "middle" and "high." A plurality of antecedent membership functions $\Delta R_L$, $\Delta R_M$ and $\Delta R_H$ are determined for the respective degrees of the change of resistance, as shown in FIG. 4.

Figure 5:
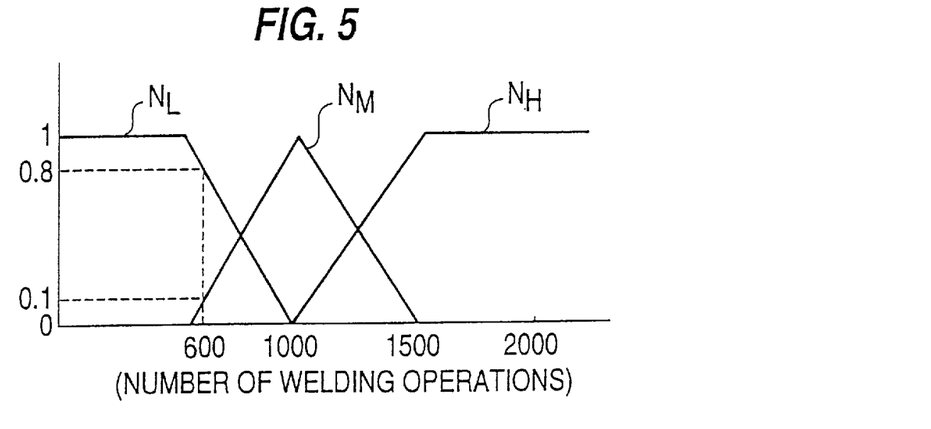
FIG. 5 is a diagram showing an example of antecedent membership functions for respective degrees of the number of welding operations, used in the fuzzy reasoning in accordance with the invention.

The number of welding operations N involving the welding electrodes 20 and 22 is also classified into three groups according to its degrees, e.g., "small", "middle" and "large." A plurality of membership functions $N_L$, $N_M$ and $N_H$ are determined for the respective degrees of the number of welding operations as shown in FIG. 5. The above is the setting of antecedent membership functions.

Figure 6:
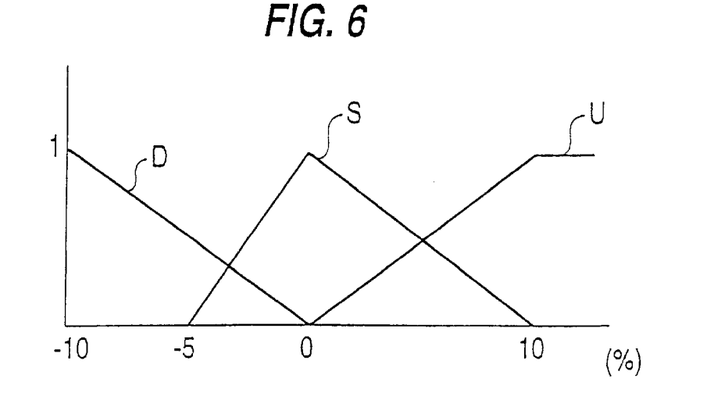
FIG. 6 is a diagram showing an example of conclusion membership functions for respective degrees of a change rate of a preselected value of welding current, used in the fuzzy reasoning in accordance with the present invention.

The change rate (correction) of the preselected value of welding current Is is also classified into three groups according to its degrees, e.g., "up", "keep" and "down." A plurality of membership functions D, S and U are determined for the respective degrees of the change rate of the preselected value of welding current, as shown in FIG. 6. These membership functions D, S and U are conclusion membership functions.

Figure 9:
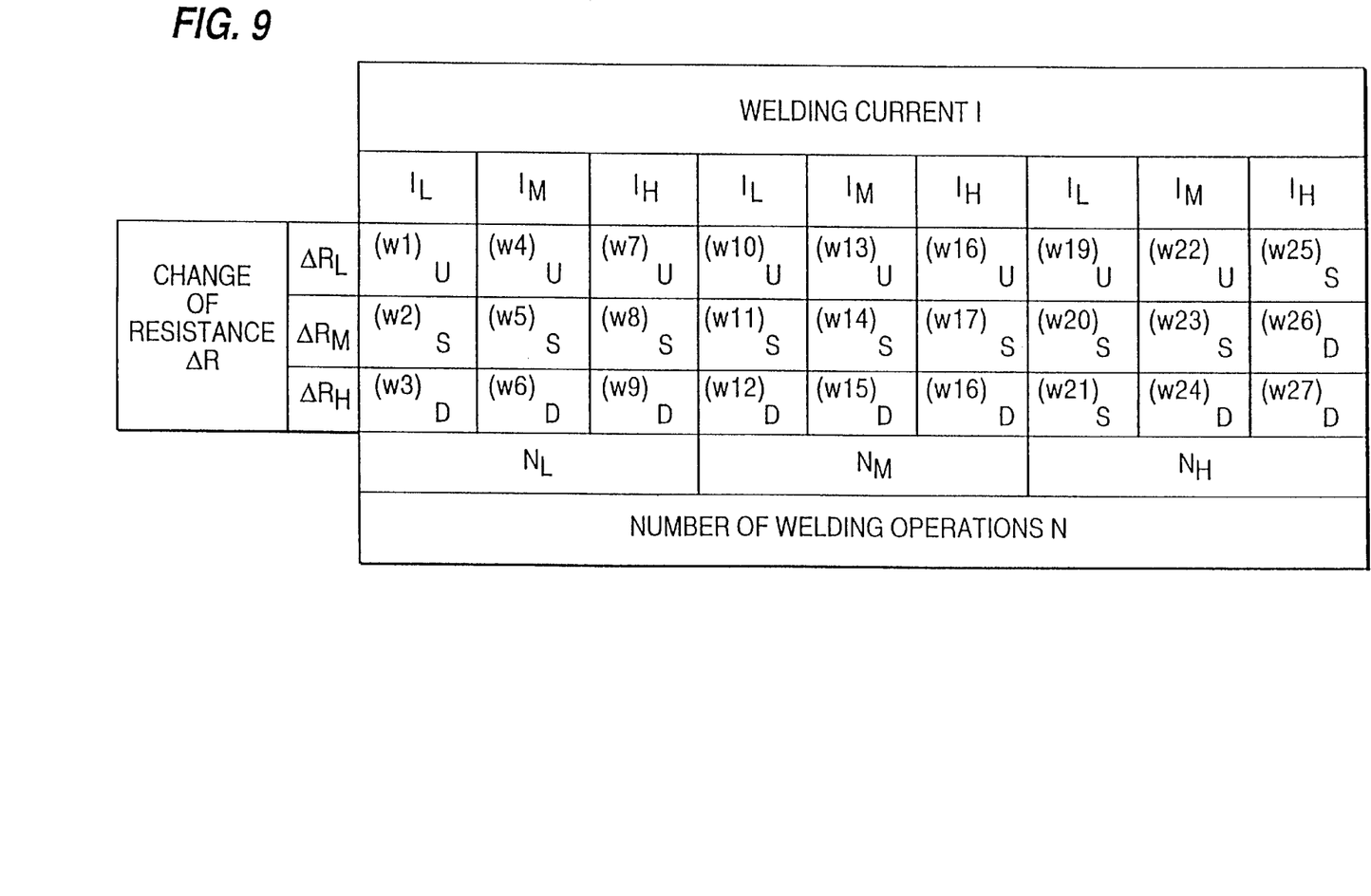
FIG. 9 is a table showing control rule in the fuzzy reasoning in accordance with the present invention.

FIG. 9 shows the control rule table used in the fuzzy reasoning of the embodiment. The control rule table provides the relationship between the antecedent and conclusion membership functions. In FIG. 9, there are three (antecedent) input variables of $\Delta R$, I and N. Each input is mapped into three fuzzy sets or degrees ($\Delta R_L$, $\Delta R_M$, $\Delta R_H$) for $\Delta R$, ($I_L$, $I_M$, $I_H$) for I and ($N_L$, $N_M$, $N_H$) for N. Thus, there are 27 control rules w1–w27 in total and each control rule has a fuzzy value of a conclusion membership function U (up), S (keep) or D (down). For example, the first control rule w1 says that if the change of resistance $\Delta R$ across the welding electrodes is small ($\Delta R_L$), if the welding current I is low ($I_L$), and if the number of welding operations N is small ($N_L$), then raise the preselected value of welding current Is(U). The twenty fifth control rule w25 says that if the change of resistance $\Delta R$ across the welding electrodes is small ($\Delta R_L$), if the welding current I is high ($I_H$), and if the number of welding operations N is large ($N_H$), then keep the preselected value of welding current (S).

The setting device 36 inputs the control rule settings together with the setting of the antecedent and conclusion membership functions to CPU 100 to store in the memory 54. In addition, the setting device 36 inputs offsetting values $\delta \Delta R$, $\delta I$ and $\delta N$ of the change of resistance $\Delta R$ across the welding electrodes, welding current I and the number of welding operations N, respectively, as a function of a changed working environment of the welding machine in accordance with the invention. These offsetting values $\delta \Delta R$, $\delta I$ and $\delta N$ are represented by a positive or negative value to be added to or subtracted from the measured $\Delta R$, I or N. In the alternative, each offsetting value may be represented by a positive or negative percent by which the measured is to be multiplied. The offsetting values $\delta \Delta R$, $\delta 1$ and $\delta N$ are stored into the memory 54.

Figure 10:
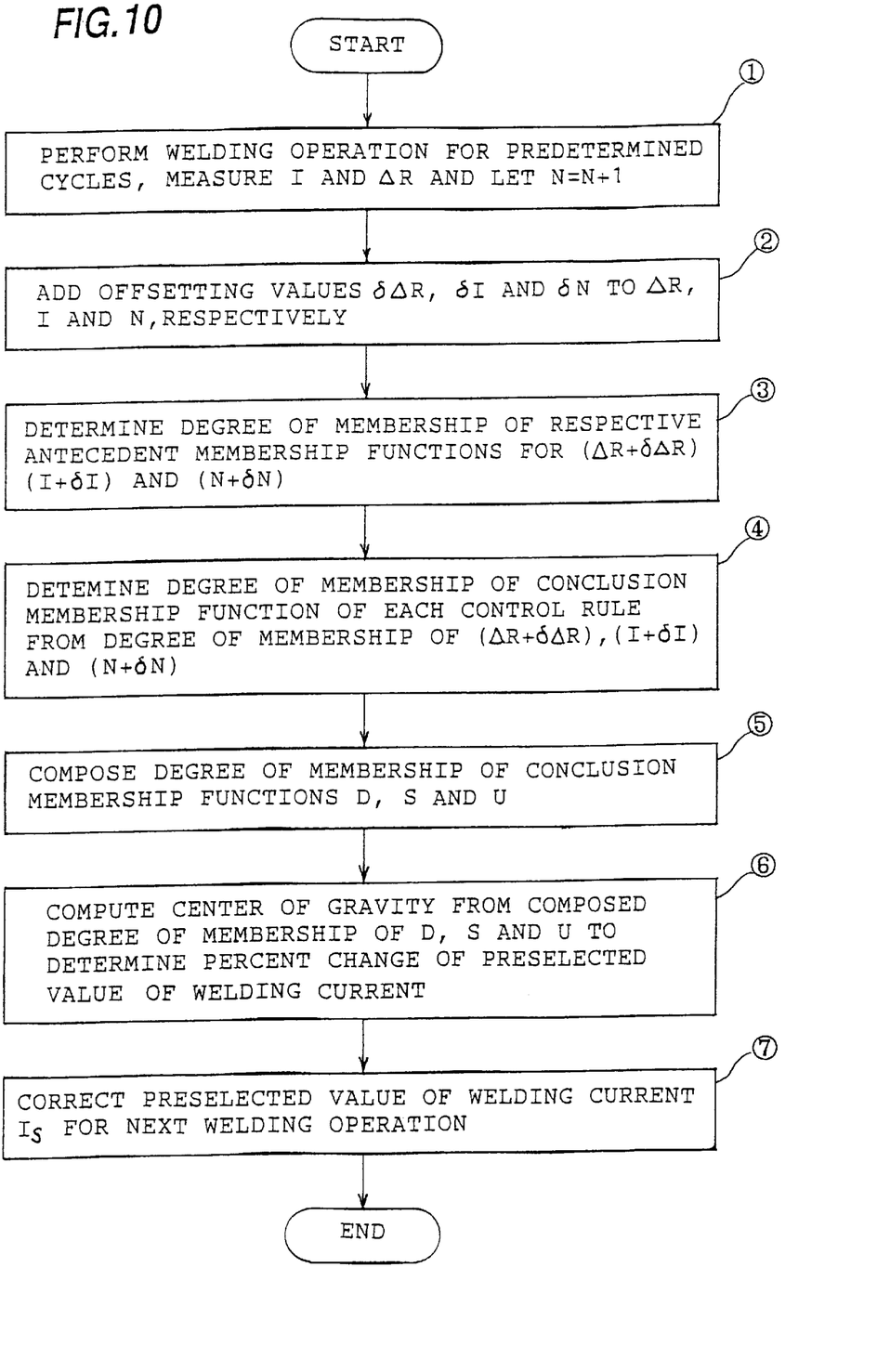
FIG. 10 is a flowchart showing the processing of the control (CPU) for the fuzzy reasoning in accordance with the present invention.

FIG. 10 is a flow chart showing an execution process of CPU 100 of the embodiment.

During a welding operation, CPU 100 performs the constant current control while measuring the welding current I (effective value) and the representative value (maximum) of the change of resistance $\Delta R$ across the welding electrodes, and then it increments the number of welding operations N by one, as shown in step (1).

After the present welding operation, the offsetting values $\delta \Delta R$, $\delta I$ and $\delta N$ are added to the measured $\Delta R$, I and N, respectively, as shown in step (2). If these offsetting values are with either a plus or minus sign, the values have only to be added to the measured value $\Delta R$, I and N. As a result of the addition, the measured $\Delta R$ has been offset to ($\Delta R + \delta \Delta R$), the measured I has been offset to ($I + \delta I$) and the measured count N has been offset to ($N + \delta N$).

Then, at step (3), CPU 100 determines the antecedent degree of membership of the offset values ($\Delta R + \delta \Delta R$), ($I + \delta I$) and ($N + \delta N$), using the respective antecedent membership functions.

Let, for example, the measured welding current I be 7 kA, the detected change of resistance $\Delta R$ be 12 $\mu\Omega$ and the counted number of welding operations N be 600. On the other hand, let the offsetting values ($\delta \Delta R$, $\delta I$ and $\delta N$) be (4, 0, 0) for suppressing or minimizing splash.

In this case, according to FIG. 3 showing the membership functions of I, the antecedent degrees of membership of the membership functions $I_L$, $I_M$ and $I_H$ are 0.3, 0.5 and 0, respectively, since ($I + \delta I$) is 7 kA. According to FIG. 4 showing the membership functions of $\Delta R$, the degrees of membership of $\Delta R_L$, $\Delta R_M$ and $\Delta R_H$, are "0", "0" and "1" since ($\Delta R + \delta \Delta R$) is 16 $\mu\Omega$. According to the membership functions of N shown in FIG. 5, as ($N + \delta N$) is 600, degree of membership of $N_L$ is "0.8" degree of membership of $N_M$ is "0.1", and degree of membership of $N_H$ is "0".

Then, at step (4), CPU 100 computes or composes degree of membership of the conclusion membership function (FIG. 6) of each control rule from the degrees of membership of its antecedent membership functions (0, 0, 1) for ($\Delta R + \delta \Delta R$), (0.3, 0.5, 0) for ($I + \delta I$) and (0.8, 0.1, 0.0) for ($N + \delta N$). This is done by selecting the minimum degree of membership of the antecedent membership function in each control rule (FIG. 9) according to the Max-Min method.

For example, the first control rule w1 is processed as follows:

$$U = I_L \times \Delta R_L \times N_L$$
$$= 0.3 \times 0 \times 0.8$$
$$= 0$$

Thus, the degree of membership of conclusion U of rule w1 is 0.

The fifth control rule w5 is processed as follows:

$$S = I_M \times \Delta R_M \times N_L$$
$$= 0.5 \times 0 \times 0.8$$
$$= 0$$

Thus, the degree of membership of conclusion S of rule w5 is 0.

The remaining control rules w2–w4 and w6–w27 are processed similarly, thus yielding the degree of membership of their conclusion membership function.

Then, at step (5), CPU 100 composes the degrees of membership of the conclusion membership functions U, S and D. This is done by selecting the maximum degrees of membership $U_{Max}$, $S_{Max}$, and $D_{Max}$ of the conclusion membership functions U, S and D according to the Max-Min method.

This yields:

$U_{Max} = 0$ $S_{Max} = 0$ $D_{Max} = 0.5$

Figure 7:
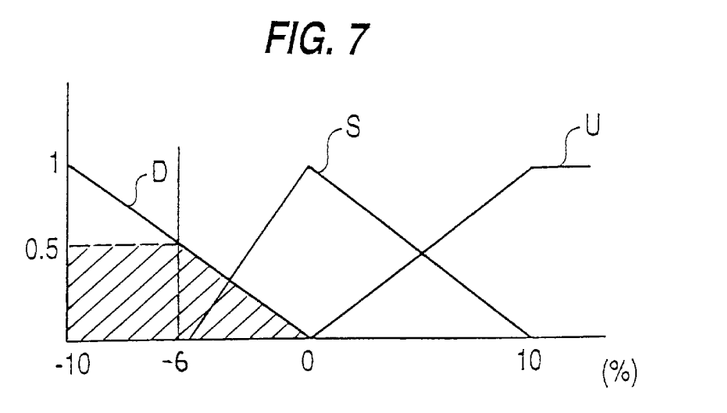
FIG. 7 is a diagram showing computation of the center of gravity in Max-Min rule for the fuzzy reasoning with offsetting in accordance with the present invention.

Next, at step (6), CPU 100 computes the percent change of the preselected value of welding current as operation value from the composed degree of membership of U, S and D according to the, center-of-gravity defuzzification method. Truncating the conclusion membership functions U, S and D with their composed degree of membership of $0(=U_{Max})$, $0(=S_{Max})$ and $0.5(=D_{Max})$ defines the hatched area in FIG. 7. Computing the center of gravity of the area with respect to the horizontal axis yields approximately negative six percent of increment (i.e., six percent of decrement) of the preselected value of welding current.

Then, at step (7), CPU 100 corrects the preselected value of welding current Is with the computed percent change and loads it into the memory 54. The stored welding current data is used as the preselected value of welding current for the next welding operation.

Thus, in the next welding operation, the feedback constant-current fuzzy control employs an updated preselected value of the welding current $I_s$ which is smaller than the previous welding current preselected value by six percent. As a result, the workpieces 24 and 26 are supplied with welding current I which is smaller than the welding current I of the previous welding operation to thereby positively suppress splash.

Without such an offsetting process of the present invention, the monitored values $\Delta R$, I and N are directly used as input variables from which degree of membership of respective membership function is computed. In that case, the degree of membership with respect to the membership functions of I (FIG. 3) and N (FIG. 5) is identical with that obtained with the offsetting with respect to the membership function of $\Delta R$ (FIG. 4), because the detected change of resistance $\Delta R$ is 12, degree of membership of $\Delta R_L$ is "0"; degree of membership of $\Delta R_M$ is "0.7" and degree of membership of $\Delta R_H$ is "0.25". Composing the degrees of membership of the conclusion membership functions U, S and D of fuzzy reasoning according to the Max-Min method yields the maximum degrees of membership $U_{max}$, $S_{max}$, and $D_{max}$ as follows.

$$U_{max}=0$$

$$S_{max}=0.5$$

$$D_{max}=0.3$$

Figure 8:
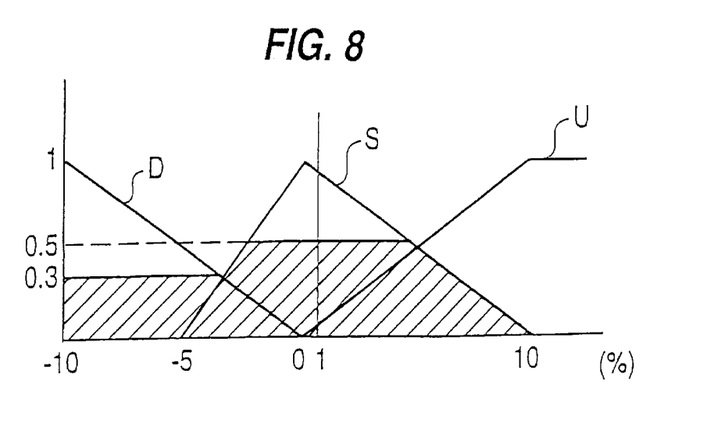
FIG. 8 is a diagram showing computation of the center of gravity in Max-Min rule, used in the fuzzy reasoning without offsetting.

Computing the center of gravity based on the composed or maximum degrees of membership $U_{max}$, $S_{max}$, and $D_{max}$ yields approximately one percent of increment of the preselected value of welding current as shown in FIG. 8.

Therefore, without the offsetting operation of the present invention, the next welding operation employs a preselected value of welding current $I_s$ that is one percent greater than the welding current of the previous welding operation, thus hardly suppressing splash.

In contrast, the offsetting feature of the present invention compensates for a difference or mismatch of a working environment of the resistance welding against fixed membership functions of the stored fuzzy rule to thereby provide an adaptive fuzzy control which can effectively suppress splash.

In this manner, the embodiment monitors the welding current I, change of resistance $\Delta R$ across welding electrodes, and the number of welding operations N as variables, add to them offsetting values $\delta \Delta R$, $\delta I$ and $\delta N$, and corrects the preselected value of welding current for the next welding operation based on the monitored and offset values, $(\Delta R+\delta \Delta R)$, $(I+\delta I)$ and $(N+\delta N)$ according to the fuzzy reasoning.

Depending on a change of the working environment due to a replacement of welding head, change of workpiece material etc., appropriate offsetting values $\delta \Delta R$, $\delta I$ and $\delta N$ may be chosen in accordance with the invention. Therefore, a control unit or CPU 100 can adoptively and finely correct or optimizes the preselected value of welding current $I_s$ without changing or updating the antecedent or conclusion membership functions or the control rules of the fuzzy reasoning. The present method does not require a skilled operator, yet assures satisfactory weld quality without splash or separation.

When offsetting value $\delta \Delta R$, $\delta I$, $\delta N$ are each given by a positive or negative percent value, the CPU 100, at step (2), may offset the monitored values $\Delta R$, I and N to $\Delta R$ (1+$\delta \Delta R$/100), I (1+$\delta I$/100) and N (1+$\delta N$/100), respectively. Correspondingly, the CPU 100, at step (3), determines respective degree of membership of the membership function for the offset values $\Delta R$ (1+$\delta \Delta R$), I (1+$\delta I$) and N (1+$\delta N$), thus achieving similar compensation.

In the illustrated embodiment, the actually monitored values are first offset before computing degree of membership of membership function therefrom. The offsetting operation can be made to actual output value (controlling value) in the defuzzification process after the fuzzy reasoning.

Among the monitored values I, $\Delta R$ and N, the change of resistance $\Delta R$ has been found to be the most important variable in determining the preselected value of welding current. Therefore, the change rate of the preselected value of welding current can be determined from the measured change of resistance $\Delta R$ only, or from $\Delta R$ and measured I, or from $\Delta R$ and N by using the offsetting and the fuzzy reasoning. The Max-Min method and center-of-gravity method stated above are only illustrative. They may be replaced by any other fuzzy reasoning and/or defuzzification method, such as the algebraic product-sum method, area method or means height method.

Figure 11:
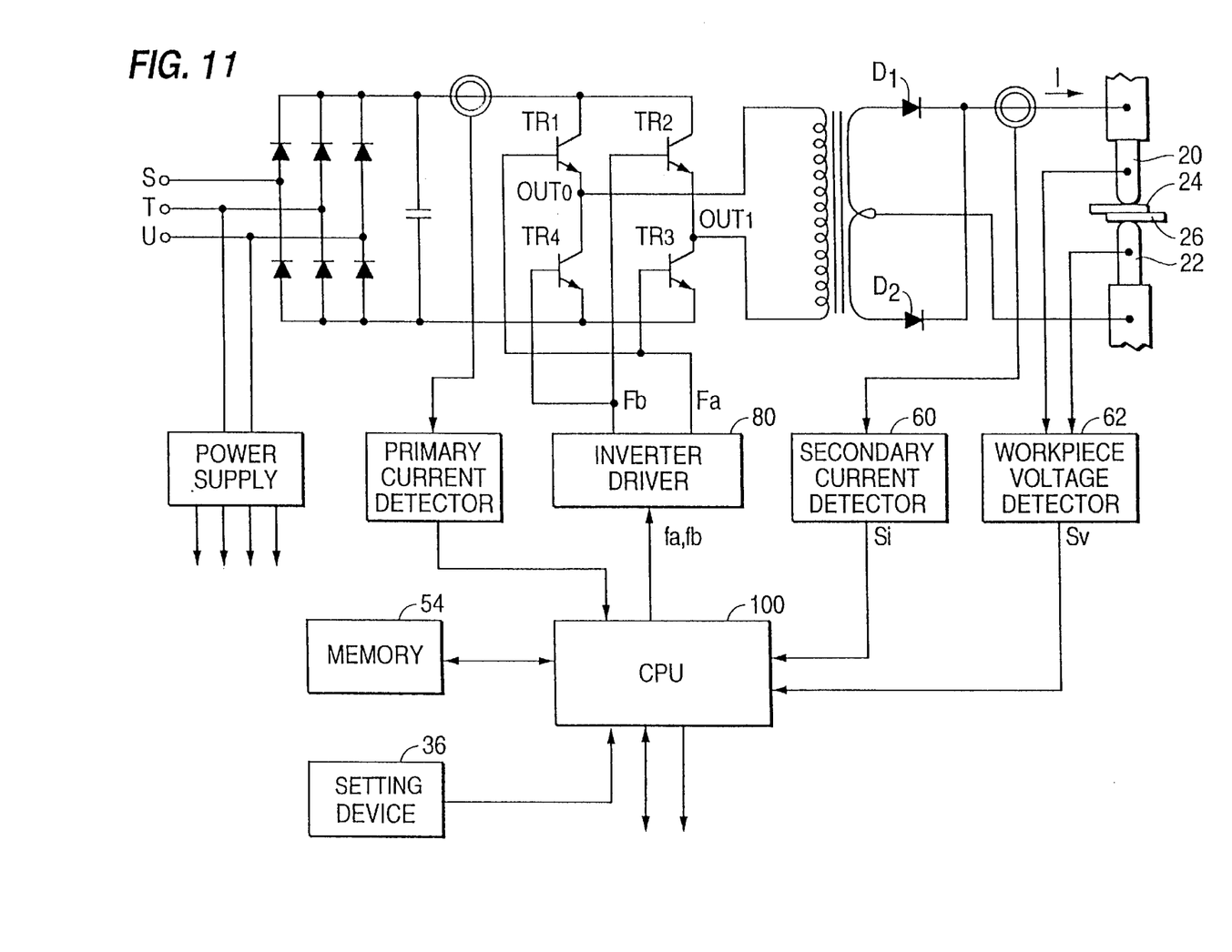
FIG. 11 is a block diagram showing an arrangement of an inverter resistance welding machine together with a control to which the control method of the present invention applies.

The embodiment applies to the resistance welding control of a single phase AC resistance welding machine. The invention can also be applied to the resistance welding control of an inverter resistance welding machine shown in FIG. 11. In FIGS. 1 and 11, corresponding components are designated by like numerals or symbols. The control apparatus of FIG. 11 can measure the welding current from either the primary or secondary circuit. CPU 100 computes the change of resistance across the welding electrodes, using the output signal Si from the secondary current detector 60 and the output signal Sv from the workpiece voltage detector 62. CPU 100 also counts the number of welding operations.

The method of the present invention for controlling resistance welding offsets monitored values of each welding operation and performs fuzzy reasoning from the offset or compensated values to automatically correct the preselected value of welding current for the next welding operation. Therefore, the method of the present invention can adapt the fuzzy reasoning to a change of working environment of resistance welding without requiring the changing or updating of the stored membership functions involved to assure optimized control and satisfactory weld quality.

I claim:

1. A method for controlling resistance welding, said method comprising:

setting a plurality of antecedent membership functions for respective degrees of a change of resistance across welding electrodes under welding operation;

setting a plurality of conclusion membership functions corresponding to said antecedent membership functions for respective degrees of a change rate of a preselected value of welding current;

setting an offsetting value for the change of resistance across the welding electrodes, wherein the offsetting value is set based on a changed environment of the resistance welding so as to minimize splash experienced during the welding operation;

detecting the change of resistance across the welding electrodes during the welding operation;

offsetting the detected change of resistance across the welding electrodes by the offsetting value; and correcting the preselected value of welding current for a subsequent welding operation based on the detected and offsetted change of resistance in accordance with the antecedent membership functions and the conclusion membership functions.

2. A method for controlling resistance welding, said method comprising:

setting a plurality of first antecedent membership functions for respective degrees of a change of resistance across welding electrodes under welding operation;

setting a plurality of second antecedent membership functions for respective degrees of a welding current under welding operation;

setting a plurality of conclusion membership functions corresponding to the first and second antecedent membership functions for respective degrees of a change rate of a preselected value of welding current;

setting a first offsetting value for the change of resistance across the welding electrodes and a second offsetting value for the welding current, wherein the first and second offsetting values are set based on a changed environment of the resistance welding so as to minimize splash experienced during the welding operation;

detecting the change of resistance across the welding electrodes during the welding operation;

measuring the welding current during the welding operation;

offsetting the detected change of resistance across the welding electrodes by the first offsetting value;

offsetting the measured welding current by the second offsetting value; and correcting the preselected value of welding current for a subsequent welding operation based on the detected and offsetted change of resistance and the measured and offsetted welding current in accordance with the first and second antecedent membership functions and the conclusion membership functions.

3. A method for controlling resistance welding, said method comprising:

setting a plurality of first antecedent membership functions for respective degrees of a change of resistance across welding electrodes under welding operation;

setting a plurality of second antecedent membership functions for respective degrees of a number of welding operations involving the welding electrodes;

setting a plurality of conclusion membership functions corresponding to the first and second antecedent membership functions for respective degrees of a change rate of a preselected value of welding current;

setting a first offsetting value for the change of resistance across the welding electrodes and a second offsetting value for the number of welding operations, wherein the first and second offsetting values are set based on a changed environment of the resistance welding so as to minimize splash experienced during the welding operation;

detecting the change of resistance across the welding electrodes during the welding operation;

counting the number of welding operations involving the welding electrodes;

offsetting the detected change of resistance across the welding electrodes by the first offsetting value;

offsetting the counted number of welding operations by the second offsetting value; and correcting the preselected value of welding current for a subsequent welding operation based on the detected and offsetted change of resistance and the counted and offsetted number of welding operations in accordance with the first and second antecedent membership functions and the conclusion membership functions.

4. A method for controlling resistance welding, said method comprising:

setting a plurality of first antecedent membership functions for respective degrees of a change of resistance across welding electrodes under welding operation;

setting a plurality of second antecedent membership functions for respective degrees of a welding current under welding operation;

setting a plurality of third antecedent membership functions for respective degrees of a number of welding operations involving the welding electrodes;

setting a plurality of conclusion membership functions corresponding to the first, second, and third antecedent membership functions for respective degrees of a change rate of a preselected value of welding current;

setting a first offsetting value for the change of resistance across the welding electrodes, a second offsetting value for the welding current, and a third offsetting value for the number of welding operations, wherein the first, second, and third offsetting values are set based on a changed environment of the resistance welding so as to minimize splash experienced during the welding operation;

detecting the change of resistance across the welding electrodes during the welding operation;

measuring the welding current during the welding operation;

counting the number of welding operations involving the welding electrodes;

offsetting the detected change of resistance across the welding electrodes by the first offsetting value;

offsetting the measured welding current by the second offsetting value;

offsetting the counted number of welding operations by the third offsetting value; and correcting the preselected value of welding current for a subsequent welding operation based on the detected and offsetted change of resistance, the measured and offsetted welding current, and the counted and offsetted number of welding operations in accordance with the first, second, and third antecedent membership functions and the conclusion membership functions.

* * * * *